US007723961B2

(12) United States Patent
Cobianu et al.

(10) Patent No.: US 7,723,961 B2
(45) Date of Patent: May 25, 2010

(54) MEMS BASED BATTERY MONITORING TECHNICAL FIELD

(75) Inventors: Cornel P. Cobianu, Bucharest (RO); Viorel-Georgel Dumitru, Ploiesti (RO); Ion Georgescu, Bucharest (RO); Mihai Gologanu, Bucharest (RO); Stefan D. Costea, Bucharest (RO)

(73) Assignee: Honeywell International Inc., Morristown, NJ (US)

( * ) Notice: Subject to any disclaimer, the term of this patent is extended or adjusted under 35 U.S.C. 154(b) by 469 days.

(21) Appl. No.: 11/890,570

(22) Filed: Aug. 7, 2007

(65) Prior Publication Data
US 2009/0039832 A1   Feb. 12, 2009

(51) Int. Cl.
*H02J 7/00* (2006.01)
*H02J 7/04* (2006.01)
*H02H 7/18* (2006.01)
*H02H 3/20* (2006.01)
*H02H 3/24* (2006.01)
*H02H 3/00* (2006.01)
*H02H 5/04* (2006.01)

(52) U.S. Cl. .............. 320/134; 320/136; 320/150; 307/10.7; 361/91.1; 361/92; 361/101; 361/103

(58) Field of Classification Search ............. 320/134, 320/136, 150; 307/10.7; 361/90, 91.1, 92, 361/101, 103
See application file for complete search history.

(56) References Cited

U.S. PATENT DOCUMENTS

| 5,731,686 | A | 3/1998 | Malhi ................... 320/35 |
| 5,773,775 | A | 6/1998 | Azema ................ 200/61.08 |
| 5,896,025 | A | 4/1999 | Yamaguchi et al. ...... 320/134 |
| 6,388,299 | B1 | 5/2002 | Kang et al. ............ 257/415 |
| 6,392,172 | B1 | 5/2002 | Azema ................ 200/61.08 |
| 6,492,058 | B1 | 12/2002 | Watanabe et al. ........ 429/121 |
| 6,518,731 | B2 * | 2/2003 | Thomas et al. ............ 320/136 |
| 6,538,866 | B1 * | 3/2003 | Hanzawa et al. .......... 361/91.1 |
| 6,570,749 | B1 | 5/2003 | Ling et al. ............. 361/102 |
| 6,602,633 | B1 | 8/2003 | Ohbayashi et al. ........ 429/82 |
| 6,720,634 | B2 | 4/2004 | Kang ................... 257/415 |
| 6,994,926 | B2 | 2/2006 | Ikeuchi et al. ............ 429/7 |
| 7,034,375 | B2 * | 4/2006 | Kang ................... 257/467 |
| 7,336,464 | B1 * | 2/2008 | Potanin et al. ........... 361/103 |
| 2004/0189245 | A1 | 9/2004 | Teraoka et al. .......... 320/107 |
| 2004/0232888 | A1 | 11/2004 | Burrus, IV et al. ........ 320/147 |

(Continued)

*Primary Examiner*—Patrick J Assouad
*Assistant Examiner*—Richard V Muralidar
(74) *Attorney, Agent, or Firm*—Kermit D. Lopez; Luis M. Ortiz; Kris T. Fredrick (57) ABSTRACT

A battery protection and monitoring system includes a plurality of MAFET (Mechanically Actuated Field Effect Transistor) switches, wherein each MAFET switch among the MAFET switches is capable of switching from an open switch condition to a closed switch condition or vice versa, such that the plurality of MAFET switches are connectable to a battery. Such a system further includes one or more transistors associated with and which communicate electrically with at least one MAFET switch among the MAFET switches. A PPTC (Polymeric Positive Temperature Coefficient) device is also associated with the transistors and the MAFET switches, such that the PPTC device, the MAFET switches and the transistors operate in association with one another and the open switch condition or the closed switch condition of the plurality of MAFET switches to identify, monitor and thus prevent at least one dangerous condition associated with the battery.

20 Claims, 5 Drawing Sheets

U.S. PATENT DOCUMENTS

| | | | |
|---|---|---|---|
| 2005/0270847 A1 | 12/2005 | Miyoshi et al. | 365/185.18 |
| 2005/0285572 A1 | 12/2005 | Geren et al. | 320/134 |
| 2006/0097701 A1 | 5/2006 | Kodama et al. | 320/147 |

* cited by examiner

MEMS BASED BATTERY MONITORING TECHNICAL FIELD

TECHNICAL FIELD

Embodiments are generally related to MEMS (Micro-Electromechanical) based components, devices and systems. Embodiments are also related to techniques and devices for battery monitoring.

BACKGROUND OF THE INVENTION

The increasing demand for high performance, lightweight, small size portable electronic devices is also increasing the requirements of rechargeable battery performance. Therefore, the amount of energy stored in a battery is increasing. Packing more energy into a cell, however, increases safety concerns. With larger batteries, an increased amount of stored energy is present, resulting in greater hazards, such as a risk that the battery may explode, causing harm to users. Therefore, there is an increasing interest in multiple paths for monitoring the status of a battery or group of batteries during different stages such as, for example, a charging phase, an operational phase, and during and transportation of the battery or batteries. Safety issues have already reached the critical stage in the case of larger batteries used in portable electronics such as laptop computers. It is therefore believed that in the future, these issues will only become increasingly of paramount importance.

Batteries with much larger capacities and increased energy densities are expected to play a significant role in tomorrow's energy and transportation systems. From storing distributed electrical power produced using intermittent renewable resources, to plug-in hybrids cars, all-electrical or battery-fuel cells hybrid cars, extra-large batteries with a large amount of packed energy densely will likely be developed for widespread use.

For instance, one favored type of high-energy density batteries whose use is expanding is the rechargeable lithium-based battery. This type of battery requires precise monitoring during its charging, operational and transportation phases, because if something goes wrong during these stages, the potential for dangerous "venting with flame' (explosion) could occur. Under certain conditions, such as when a battery is overcharged, overheated or a short-circuit occurs, the chemical reaction can spin out of control, causing a thermal runaway situation and pressure build-up within the cell that ultimately could cause the battery to explode. Therefore, key safety challenges include preventing accidental overcharging, overheating, over-pressure, overshock and damage that could cause an internal short-circuit. Despite various and complex safety mechanisms developed, the safety issue of such batteries remains an important issue in the continued development of batteries such as those utilized in laptop computers and hybrid vehicles.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of the present invention to provide for an improved battery monitoring system.

It is another aspect of the present invention to provide for a MEMS-based battery monitoring system.

It is yet a further aspect of the present invention to provide for a battery monitoring system that utilizes MAFET (Mechanically Actuated Field Effect Transistor) switches.

The aforementioned aspects of the invention and other objectives and advantages can now be achieved as described herein. A battery protection and monitoring system is disclosed, which includes a plurality of MAFET (Mechanically Actuated Field Effect Transistor) switches, wherein each MAFET switch among the MAFET switches is capable of switching from an open switch condition to a closed switch condition or vice versa, such that the plurality of MAFET switches are connectable to a battery.

Each MAFET switch generally constitutes a Metal Oxide Semiconductor Field Effect Transistor (MOSFET) with a suspended gate that is capable of an "up" or "down" position as a function of bias and external physical parameters such as pressure, temperature, acceleration, etc. With the gate in the "up" position, the MAFET switch is in the "OFF" condition and electric current cannot flow through the MAFET switch. With the gate in the "down" position, the MAFET switch is in the "ON" condition and the electric current flows through the MAFET switch.

Such a system or circuit further includes one or more transistors associated with and which communicate electrically with at least one MAFET switch among the MAFET switches. A PPTC (Polymeric Positive Temperature Coefficient) device is also associated with the transistors and the MAFET switches, such that the PPTC device (e.g., a temperature dependent organic resistance, highly increasing its value when temperature value is high), the MAFET switches and the transistors operate in association with one another and the open switch condition or the closed switch condition of the plurality of MAFET switches is attained in order to identify, monitor and prevent one or more dangerous condition associated with the battery.

The disclosed system thus generally constitutes a battery protection circuit including Mechanically Actuated Field Effect Transistor (MAFET) switches. Such an approach provides for over-temperature protection and also provides the battery protection system with new functions such as shock protection and active pressure monitoring inside the cell with low cost components. Utilizing MAFET switches, which are based on the moving gate field effect transistor principle, it is possible to monitorize directly the pressure build-up inside the cell. Since the pressure build-up is finally the dangerous process which could conduct to an explosion, by its permanent monitoring an increased battery safety is obtained. Due to its programmable ON/OFF characteristic, the included MAFET pressure switch allows an earlier detection of the dangerous pressure build-up than the existing mechanical circuit breakers. Also included in the protection system is a movable gate FET based shock switch, which makes it is possible to stop the charging process in case of an accident that could affect the battery life time or even worse, the physical integrity of the battery and its surroundings.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate at least one embodiment of the present invention and are not intended to limit the scope of the invention.

Figure 1A:
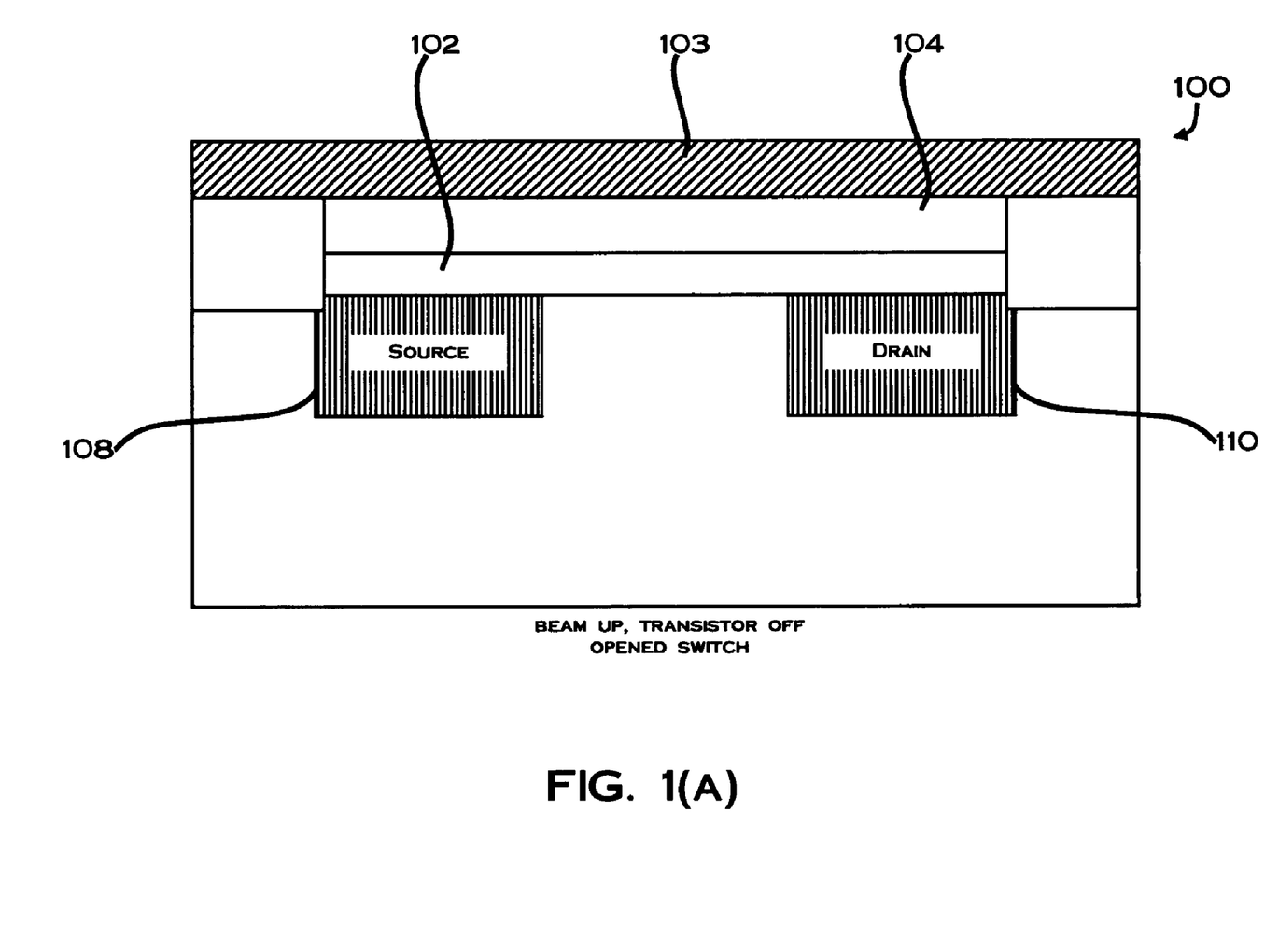
FIGS. 1(a) and 1(b) illustrate respective side-sectional views of a MAFET (Mechanically Actuated Field Effect Transistor) switch, which can be adapted for use in accordance with one or more embodiments.
Figure 1B:
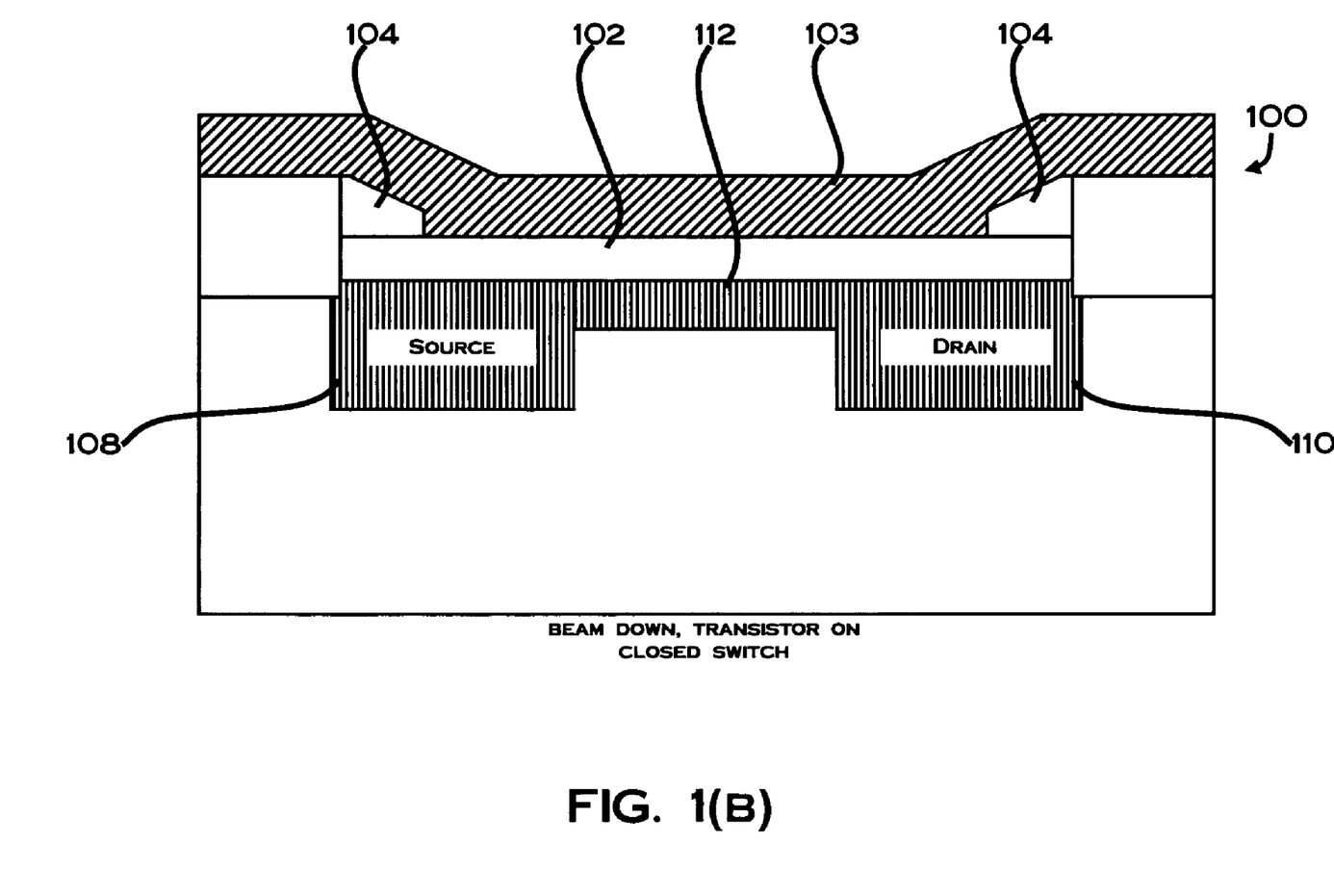

FIGS. 1(a) and 1(b) illustrate respective side-sectional views of a MAFET (Mechanically Actuated Field Effect Transistor) switch 100, which can be adapted for use in accordance with one or more embodiments. For an extended monitoring of rechargeable batteries (e.g., lithium-based batteries) during charge, operation, and transportation, one or more Mechanically Actuated Field Effect Transistor (MAFET) switches 100 can be implemented in accordance with the disclosed embodiments. MAFET switch 100 generally includes a source 108 and a drain 110. An air gap 104 is generally located between in insulation layer or insulator 102 and a gate (or beam) 103. Note that in FIGS. 1(a) and 1(b), identical or similar parts or elements are generally indicated by identical reference numerals. FIG. 1(a) illustrates the MAFET switch 100 in a "beam up" transistor OFF, opened switch configuration, whereas FIG. 1(b) illustrates MAFET switch 100 in a beam down, transistor ON, closed switch state.

MAFET switch 100 operates based on the moving gate MOS field effect transistor principle schematically depicted with respect to FIGS. 1(a) and 1(b). MAFET switch 100 contains an actuating gate 103 that is sensitive to external inputs. Such inputs can be either acceleration, temperature, or pressure. The beam that operates as the transistor gate deflects as a function of the external input and applied gate voltage. As the external input (i.e. temperature, acceleration, or pressure) changes from some nominal point, the beam begins to deflect downward toward the transistor surface. The applied gate voltage completes this movement with respect to the transistor surface and pulls the moving gate 103 closed (e.g., snapping down) when the external input exceeds the design threshold. This allows current to flow from the source 108 to the drain 110 in the transistor or MAFET switch 100. Some non-limiting examples of MAFET based switches, which may be adapted for use in accordance with one or more embodiments, are described in U.S. Pat. No. 6,388,299 (pressure switch), U.S. Pat. No. 6,720,634 (acceleration switch) and U.S. Pat. No. 7,034,375 (thermal switch).

U.S. Pat. No. 6,388,299 entitled, "Sensor Assembly and Method" which issued to Kang et al on May 14, 2002, and is assigned to Honeywell International Inc of Morristown, N.J., U.S.A., is incorporated herein by reference. U.S. Pat. No. 6,720,634 entitled, "Contactless Acceleration Switch" which issued to Joon-Won Kang on Apr. 13, 2004 is also assigned to Honeywell International Inc and is incorporated herein by reference. U.S. Pat. No. 7,034,375 entitled "Micro Electromechanical Systems Thermal Switch" which issued to Joon-Won Kang on Apr. 26, 2006 is additionally assigned to Honeywell International Inc and is incorporated herein by reference. It can be appreciated that the aforementioned patents are cited for general edification and informational purposes only and are not considered limiting features of the embodiments. Instead, such patents are discussed herein as an illustration of some examples of MAFET components that can be adapted for use in accordance the one or more embodiments.

Figure 2:
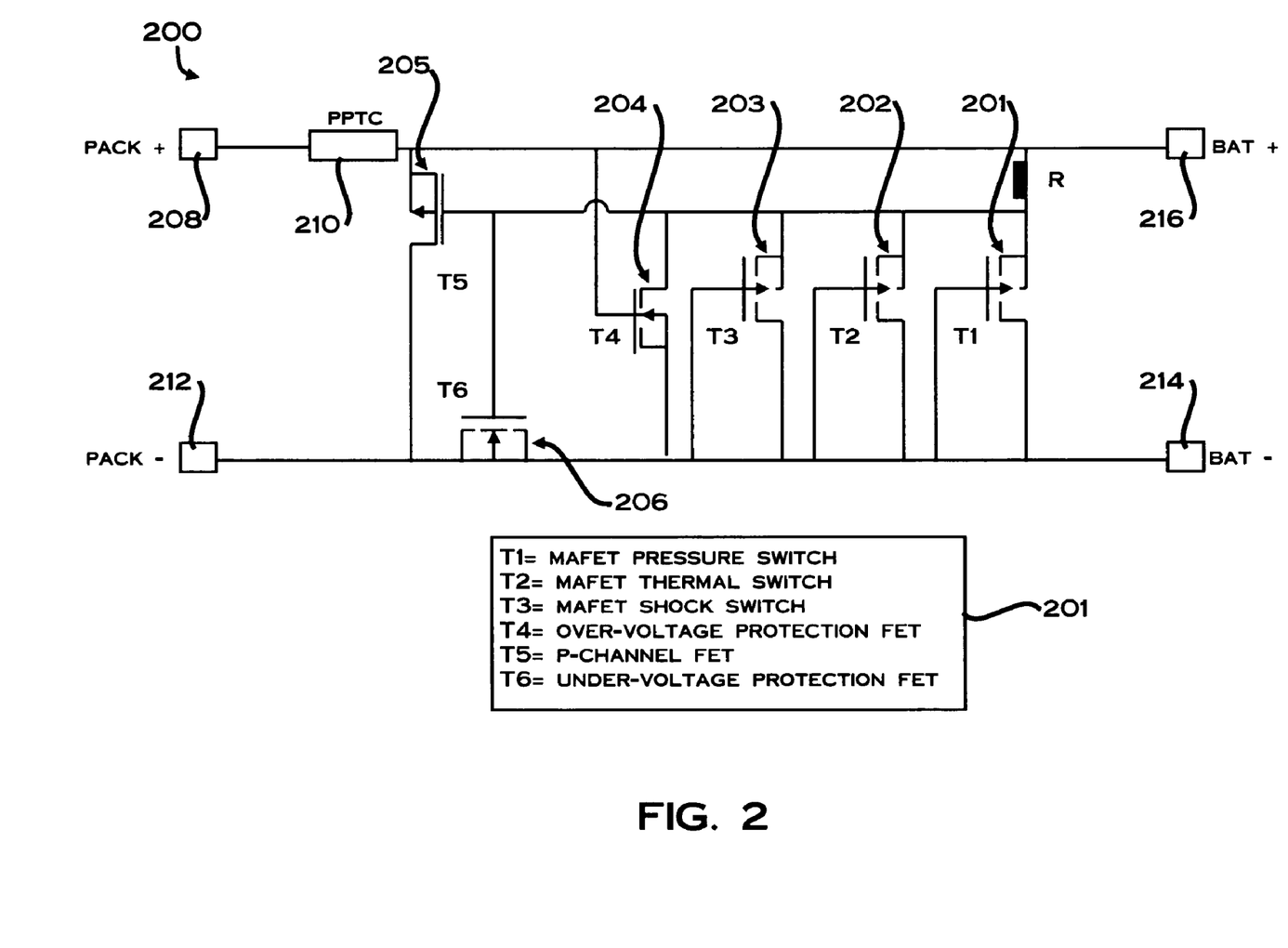
FIG. 2 illustrates a battery protection system, which can be implemented in accordance with a preferred embodiment.

FIG. 2 illustrates a battery protection system 200, which can be implemented in accordance with a preferred embodiment. The proposed battery protection circuit or system 200 depicted in FIG. 2 includes a MAFET pressure switch 201 (T1), a MAFET temperature switch 202 (T2), and a MAFET shock switch 203 (T3) together with MOS (Metal Oxide Semiconductor) field effect transistors 204, 205, and 206 (respectively also labeled T4, T5, and T6) and a polymeric positive temperature coefficient (PPTC) device 210. A load resistance R is connected to MAFET switches 201, 202, 203, and FET 204. Transistor 205 is connected to the PPTC device 210. Transistor 206 is connected to transistor 205 and transistors 201, 202, 203, 204, and also to the load resistance R. The system or circuit 200 is generally connected to a battery represented by battery terminals 214 and 216. Respective positive and negative "Pack" terminals 208 and 212 are also illustrated in FIG. 2. Terminal 208, for example, is connected to the PPTC device 210. A legend 201 is additionally illustrated in FIG. 2, which describes the general components of system/circuit 200.

In a normal battery operational phase, the power MOSFET transistor 205 is OFF and the MOSFET transistor 206 is ON. When a dangerous phenomenon occurs (e.g., pressure build-up inside the cell, a temperature increase above a safety threshold, a threshold mechanical shock that could damage the battery, etc.) the corresponding MAFET switch (MAFET transistor 201 or 202, or 203) senses such a dangerous condition and turns itself into the ON state. Therefore, a current begins to flow through the load resistance R. This will produce a decrease of the voltage on the gates of MOS field effect transistors 205 and 206. Note that MOS power transistor 205 can also function as a P-channel transistor, and MOS transistor 206 can function as an N-channel transistor. The voltage decrease will turn ON the P-channel MOS power transistor 205 and also turn OFF the N-channel MOS T6 transistor. By turning ON the power MOS transistor 205, the resulting current path can take place through the PPTC device 210 and the transistor 205, thus shunting the battery and preventing it from further charging. Due to their closed spatial location between PPTC device 210 and the power transistor 205, the high current flowing through the power transistor 205 can further increase the temperature on the PPTC device 205, which can increase its electrical resistance and thus limits the current flowing through the power MOS transistor 205, thereby protecting it from thermal runaway conditions.

A supplementary protection feature of the battery can be enhanced as result of turning OFF the MOS transistor 206, which can also disconnect the battery represented by terminals 214, 216 from the charger. The over-voltage protection can be accomplished by the N-channel field effect MOS transistor 204 whose gate and source are connected directly to the battery (i.e., see battery terminals 214, 216). In this manner, the battery voltage is the same with respect to the gate-source voltage of transistor 204. By properly selecting MOS transistor 204, its gate-source threshold value may be the same as the dangerous over-voltage value. Therefore, when a dangerous high value of the battery voltage occurs, the T4 MOS transistor 204 will turn ON and consequently, a current will flow through the load resistance R depicted in FIG. 2. This functionality will turn ON the T5 MOS transistor 205 and simultaneously will turn off the MOS T6 transistor 206 as in the case of the over-pressure, over-temperature or shock situations described above.

When a battery voltage decreases lower than a certain specific value (e.g., an under-voltage situation), this voltage may also constitute the gate-source voltage of transistor 206 (assuming that transistors 201, 202, 203, 204 are in the OFF state). By properly selecting the T6 MOS transistor 206, it can turn OFF at this low voltage value and thus disconnect the battery. The PPTC device 210 offers protection against both charge and discharge over-currents and a supplementary over-temperature protection. Additionally, in case that PPTC device 210 is in thermal contact with the MOSFET power transistor 205, the PPTC device 210 can detect also any overheating of this transistor and thus protect it. In addition, the PPTC device 210 can offer a supplementary protection against any over-temperature or over-voltage, or, pressure build-up or dangerous mechanical shock, due to thermal coupling with the T5 MOS transistor 205, which may enter the ON state and heat up when, any of the aforementioned events occur.

In this manner, such a protection circuit including MAFET switches can offer an elegant and low cost protection system for rechargeable batteries. Due to the simultaneous turn ON of transistor 205 and turn OFF of transistor 206 in case of any excessive temperature, pressure, charge voltage or mechanical shocks, such a circuit can offer double layer protection against all or only a part of such dangers. As described above, a supplementary protection is achieved via the PPTC device 210. In the illustrative circuit or system 200 depicted in FIG. 2, the MAFET switches generally contain P-channel transistors. However, such a circuit can be modified to employ MAFET switches built with N-channel transistors.

Also, it should be recognized that the protection circuit 200 depicted in FIG. 2 could be realized in less complex versions, with less protection functions. As the MAFET pressure, temperature and shock switches are parallel connected; the circuit 200 could be implemented to contain only one of the three MAFET switches or any combination of two switches. Its working principle will remain the same, only the protection functions will be reduced accordingly with the eliminated switches. For instance, if in some specific cases the shock danger is not so great (e.g. in a battery for stationary application), the MAFET switch 203 may not be included in circuit 200. In such a case the circuit 200 can still function in the same manner as all switches were present, but will not be able to detect and offer protection against a mechanical shock.

Figure 3:
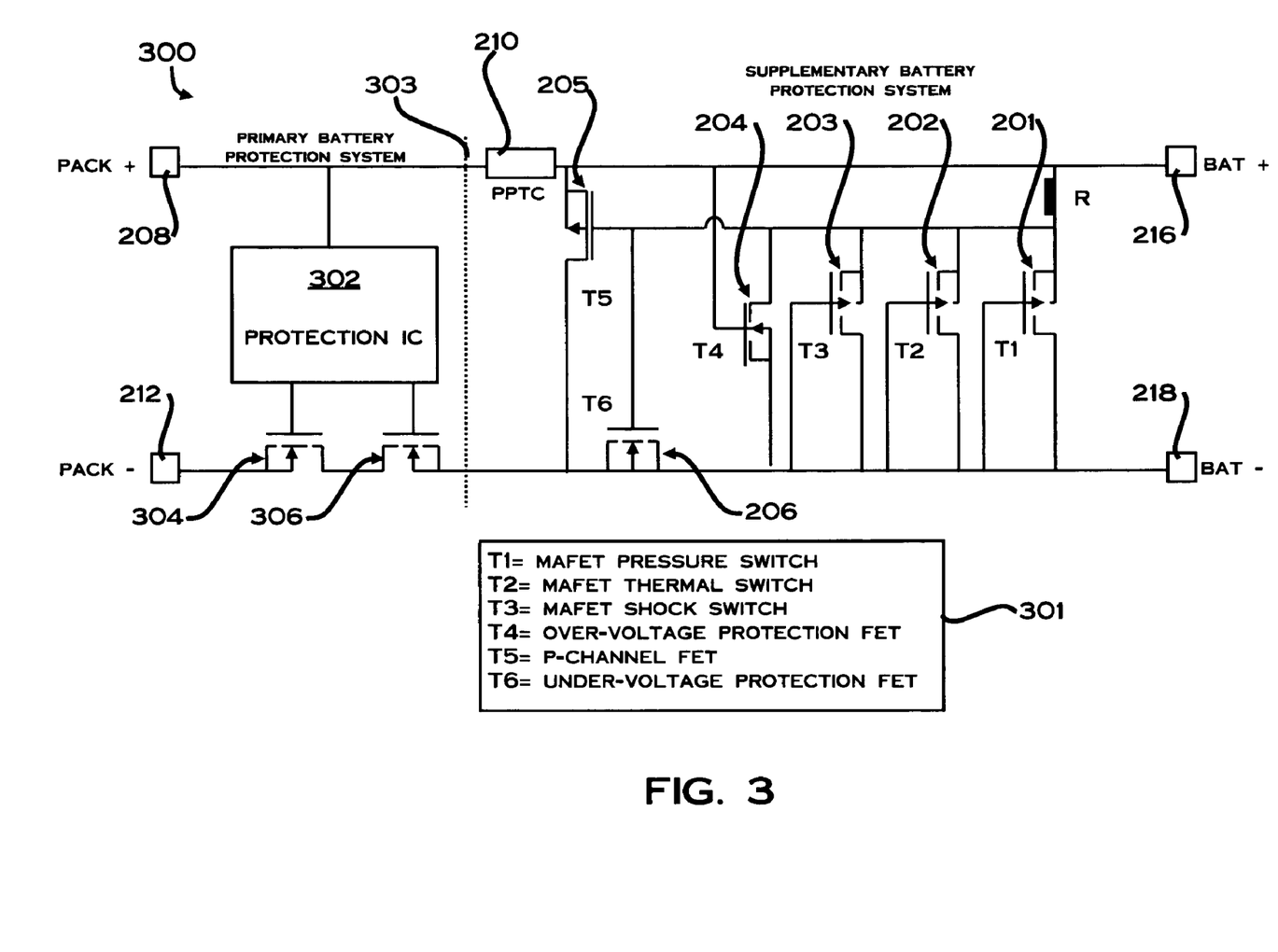
FIG. 3 illustrates a battery protection system, which can be implemented in accordance with an alternative embodiment.

It can additionally be appreciated that the MAFET-based protection circuit 200 of FIG. 2 can be used as a double layer protection together with classical protection circuits containing two FETs and an integrated circuit, such as those that are currently utilized for battery protection. An example of such a configuration is depicted in FIG. 3, which illustrates a battery protection system 300, which can be implemented in accordance with an alternative embodiment. Note that in FIGS. 2-3, identical or similar parts or elements are generally indicated by identical reference numerals.

In the alternative configuration circuit 300, which is depicted in FIG. 3, the MAFET based protection circuit 200 depicted in FIG. 2 can act as a supplementary battery protection system. Circuit 300 generally includes battery terminals 216, 214 and MAFET switches 201, 202, 203, along with the MOS transistors 204, 205, and 206. A dashed line 303 depicted in FIG. 3 generally represents symbolically the dividing line between the supplementary battery protection system and a primary battery protection system. The primary battery protection system generally includes transistors MOSFET 304 and 305 connected to an IC protection circuit 302.

Figure 4:
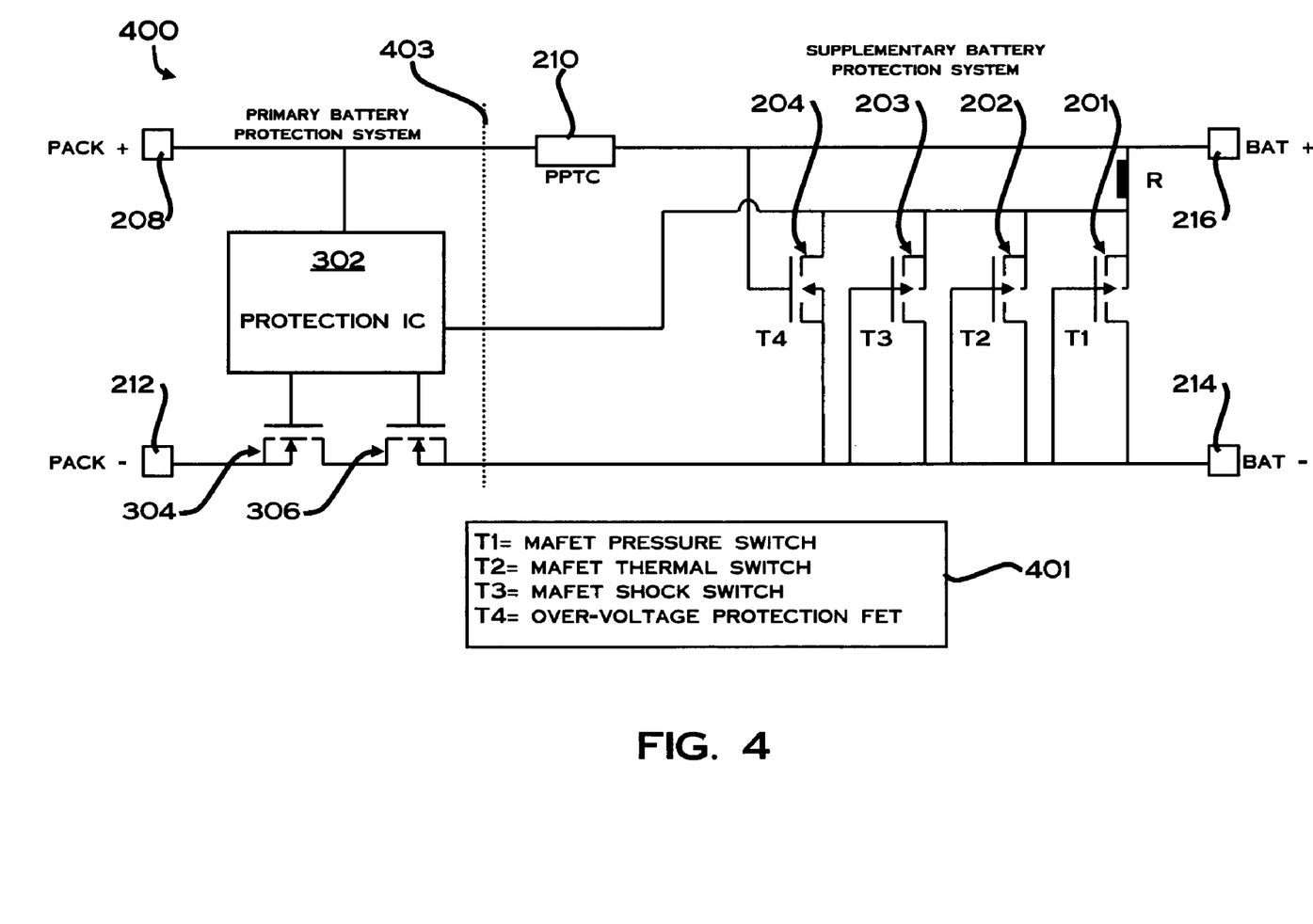
FIG. 4 illustrates a battery protection system, which can be implemented in accordance with another embodiment.

FIG. 4 illustrates a battery protection system or circuit 400, which can be implemented in accordance with another embodiment. Note that in FIGS. 2-3, identical or similar parts or elements are generally indicated by identical reference numerals. The circuit/system 400 includes a supplementary batter protection system and a primary batter protection system which are indicated via the dashed line 403 in FIG. 4. A legend 401 indicates properties associated with MAFET switches 201, 202, and 203.

Circuit/System 400 represents a modified version of the MAFET based protection circuit or system 300. The circuit 200 depicted in FIG. 2 can be integrated in association with a classic protection circuit in the context of a hybrid system. In such case, the MAFET switches as well as the over-voltage protection MOSFET 204 (i.e., T4) can act only as threshold sensors that detect dangerous pressure build-up, over-temperature conditions, mechanical shock and/or over-voltage and can signal such conditions to the protection IC 302. Such a system 300 or 400 can also be used for recording data regarding any potential dangerous event that occurs.

A number of advantages can result from the implementation of circuits/systems 200, 300 and/or 400 in the context of battery protection. Such a system(s) can utilize a MAFET pressure switch (MOSFET principle based) for battery protection against explosion due to high pressure built-up during charging the battery. Such a system(s) can also utilize a MAFET temperature switch in a circuit for battery protection against overheating due to overcharging the battery. Additionally, such a system(s) can also make use of a MAFET acceleration switch for battery protection against hazardous operations due to a shock to which it may have been exposed. Such a system(s) also offers battery protection functions with respect to dangerous battery conditions such as over-voltage, under-voltage, over-temperature, over-pressure and over-shock. Such protection features can be performed with MOSFET devices and sensors acting in the context of a multi-functional standalone battery protection circuit.

An integrated system can also be implemented that includes the aforementioned active devices located within a battery for accurate monitoring of its operation. A MOSFET based protection circuit can also be added as a back protection circuit to existing battery protection circuitry, where for example, two MOSFET components may be located in series with a battery charging circuit for interrupting the battery operation in case of over-voltage or under-voltage charging current. Additionally, switching temperature, pressure and shock specific to a certain type of battery can be set by the battery manufacturer by means of a preset voltage by considering the value specific to the battery chemistry and its operation in case of over-pressure and or over-temperature.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered.

The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

The embodiments of the invention in which an exclusive property or right is claimed are defined as follows. Having thus described the invention what is claimed is:

1. A battery protection and monitoring system, comprising:
   a plurality of MAFET (Mechanically Actuated Field Effect Transistor) switches, wherein each MAFET switch among said plurality of MAFET switches is switched from an open switch condition to a closed switch condition or vice versa, said plurality of MAFET switches connected to a battery;
   a plurality of MOSFET transistors connected to communicate electrically with at least one MAFET switch among said plurality of MAFET switches; and
   a PPTC (Polymeric Positive Temperature Coefficient) device connected to said plurality of transistors and said plurality of MAFET switches, wherein said PPTC device, said plurality of MAFET switches and said plurality of transistors operate with one another and said open switch condition or said closed switch condition of said plurality of MAFET switches to identify, monitor and prevent at least one dangerous condition of said battery.

2. The system of claim 1 wherein said plurality of transistors comprises at least one P-channel MOSFET power transistor and at least one under-voltage protection N-channel MOS transistor.

3. The system of claim 1 further comprising a primary battery protection circuit including at lease one protection IC in association with a plurality of transistors, wherein said at least one protection IC is connected electrically to said PPTC device.

4. The system of claim 1 wherein each MAFET switch among said plurality of MAFET switches is connected electrically in parallel with one another.

5. The system of claim 1 further comprising a load resistor electrically connected in series to at least one MAFET switch among said plurality of MAFET switches, a tandem between said load resistor and said plurality of MAFET switches connected electrically in parallel with a positive terminal and a negative terminal of said battery.

6. The system of claim 1 wherein at least one MAFET switch among said plurality of MAFET switches comprises a pressure switch.

7. The system of claim 1 wherein at least one MAFET switch among said plurality of MAFET switches comprises an acceleration switch.

8. The system of claim 1 wherein at least one MAFET switch among said plurality of MAFET switches comprises a thermal switch.

9. The system of claim 1 wherein said plurality of MAFET switches, said plurality of transistors and said PPTC device operate in association with another to provide an over-voltage function and an under-voltage protection function with respect to said battery.

10. The system of claim 1 wherein said PPTC device is connected in series with said battery and provides a charge over-current protection functionality, a discharge over-current protection functionality and a supplementary over-temperature protection functionality with respect to said battery.

11. The system of claim 1 wherein said PPTC device is thermally linked to at least one FET that is electrically connected in parallel with said battery and that is driven by any of at least one of said plurality of MAFET switches.

12. The system of claim 1 wherein at least one MAFET switch among said plurality of MAFET switches is based on a P-channel MOS transistor or an N-channel MOS transistor.

13. The system of claim 1 wherein said battery comprises a battery cell wherein said system is located integral or partially inside or outside of said battery cell.

14. The system of claim 1 where said system comprises a back-up protection system or a supplementary protection system connected in parallel with a primary battery protection system that comprises at least one IC and at least two field-effect transistors.

15. A battery protection and monitoring system, comprising:
   a plurality of MAFET (Mechanically Actuated Field Effect Transistor) switches, wherein each MAFET switch among said plurality of MAFET switches is switched from an open switch condition to a closed switch condition or vice versa, said plurality of MAFET switches connected to a battery;
   a plurality of MOSFET transistors connected to and which communicate electrically with at least one MAFET switch among said plurality of MAFET switches;
   a load resistor electrically connected to at least one MAFET switch among said plurality of MAFET switches;
   a PPTC (Polymeric Positive Temperature Coefficient) device connected to said plurality of transistors and said plurality of MAFET switches, wherein said PPTC device, said plurality of MAFET switches and said plurality of transistors operate with one another and said open switch condition or said closed switch condition of said plurality of MAFET switches to identify, monitor and prevent at least one dangerous condition of said battery and wherein said plurality of MAFET switches, said plurality of MOSFET transistors and said PPTC device operate with another to provide an over-voltage function and an under-voltage protection function with respect to said battery.

16. The system of claim 15 wherein at least one MAFET switch among said plurality of MAFET switches is based on a P-channel transistor or an N-channel transistor.

17. The system of claim 15 wherein said battery comprises a battery cell wherein said system is located integral or partially inside or outside of said battery cell.

18. A battery protection and monitoring system, comprising:
   a plurality of MAFET (Mechanically Actuated Field Effect Transistor) switches, wherein each MAFET switch among said plurality of MAFET switches is switched from an open switch condition to a closed switch condition or vice versa, said plurality of MAFET switches connected to a battery;
   a plurality of transistors connected to and which communicate electrically with at least one MAFET switch among said plurality of MAFET switches; and
   a PPTC (Polymeric Positive Temperature Coefficient) device connected to said plurality of transistors and said plurality of MAFET switches, wherein said PPTC device, said plurality of MAFET switches and said plurality of transistors operate with one another and said open switch condition or said closed switch condition of said plurality of MAFET switches to identify, monitor and prevent at least one dangerous condition of said battery; and a primary battery protection circuit including at least one protection IC with a plurality of transistors, wherein said at least one protection IC is connected electrically to said PPTC device, wherein each MAFET switch among said plurality of MAFET switches are connected electrically in parallel with one another, and in series with a resistance, while a tandem thereof is connected in parallel with a positive terminal and a negative terminal of said battery.

19. The system of claim 18 wherein said plurality of MAFET switches, said plurality of transistors and said PPTC device operate in association with one another to provide an over-voltage function and an under-voltage protection function with respect to said battery.

20. The system of claim 18 wherein:
  at least one MAFET switch among said plurality of MAFET switches comprises a pressure switch, an acceleration switch and/or a thermal switch; and
  said integrated system for battery protection acts as a secondary protection circuit connected to at least one primary protection circuit based on at least two MOSFET components.

* * * * *